United States Patent [19]

Mercado

[11] Patent Number: 4,704,011

[45] Date of Patent: Nov. 3, 1987

[54] THREE-GLASS PHOTOGRAPHIC OBJECTIVE COLOR-CORRECTED AT FOUR WAVELENGTHS

[75] Inventor: Romeo I. Mercado, San Jose, Calif.

[73] Assignee: Lockheed Missiles & Space Company, Inc., Sunnyvale, Calif.

[21] Appl. No.: 808,138

[22] Filed: Dec. 13, 1985

[51] Int. Cl.⁴ .................................................. G02B 9/60
[52] U.S. Cl. ....................................... 350/467; 250/464
[58] Field of Search ........................ 350/467, 483, 464

[56] References Cited

U.S. PATENT DOCUMENTS

| 2,500,017 | 3/1950 | Altman | 350/483 |
| 3,395,962 | 8/1968 | Herzberger et al. | 350/464 |
| 4,349,249 | 9/1982 | Brixner et al. | 350/483 |

OTHER PUBLICATIONS

Robb et al., Glass Selection for Hyperachromatic Triplets, JOSA, vol. 73, Dec. 1983, p. 1882.

*Primary Examiner*—John K. Corbin
*Assistant Examiner*—P. M. Dzierzynski
*Attorney, Agent, or Firm*—John J. Morrissey

[57] ABSTRACT

Three different embodiments are shown of a photographic objective comprising only six lens elements, which is made of three different optical glasses, and which is well-corrected for both monochromatic and chromatic aberrations and has only negligible secondary and higher-order spectra in a wavelength band extending from the visible to the near infrared regions of the electromagnetic spectrum. The photographic objective is also color-corrected at four widely separated wavelengths in that band. The first embodiment is optimized for a 200 mm focal length at a relative aperture of f/4 over a 12° field of view. The second embodiment is optimized for a 200 mm focal length at a relative aperture of f/5 over a 20° field of view. The third embodiment is optimized for a 200 mm focal length at a relative aperture of f/4 over a 12° field of view.

11 Claims, 11 Drawing Figures

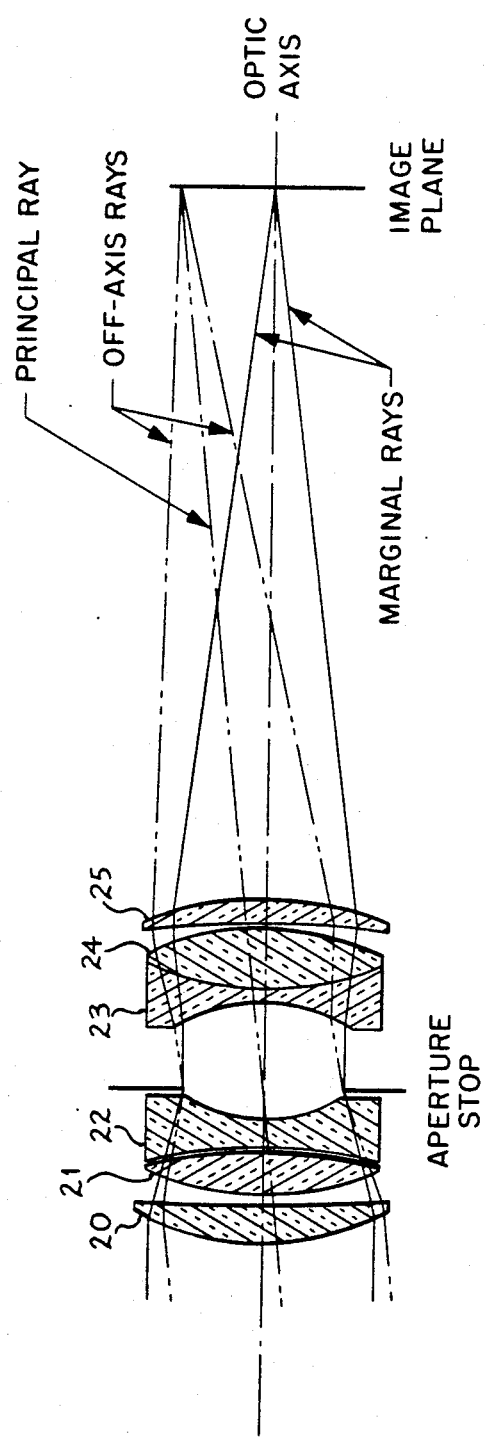
FIG_1

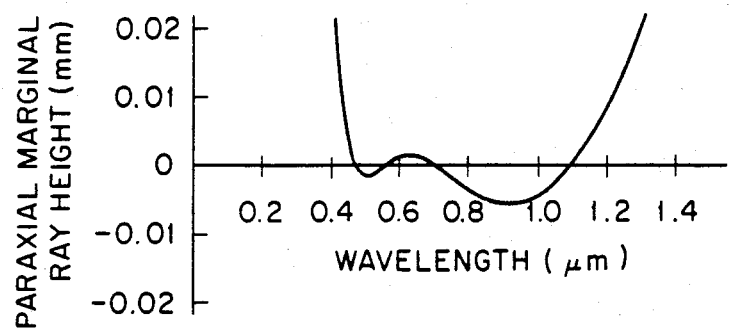
FIG_2
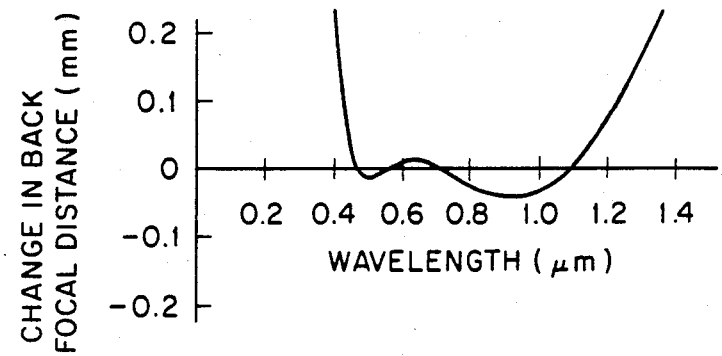
FIG_3
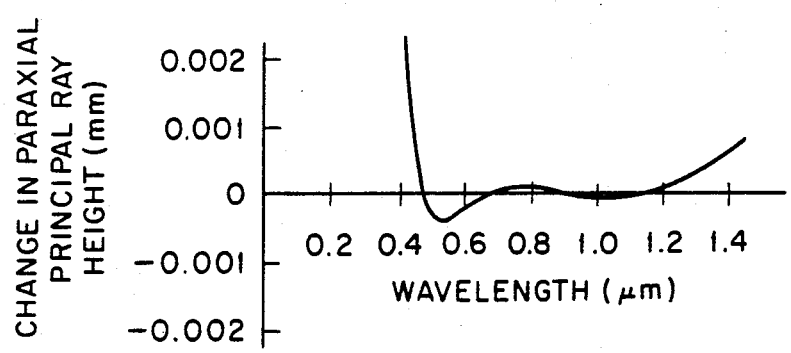
FIG_4

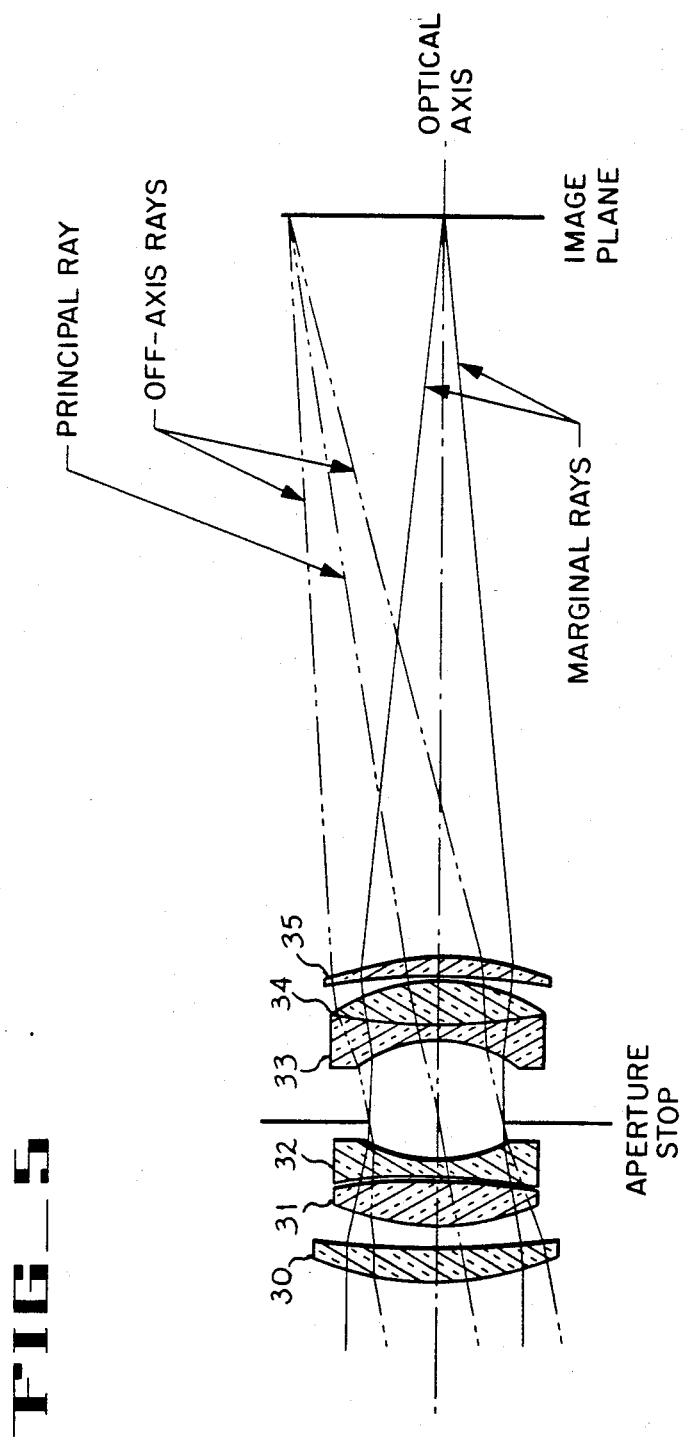
FIG_5

FIG_6
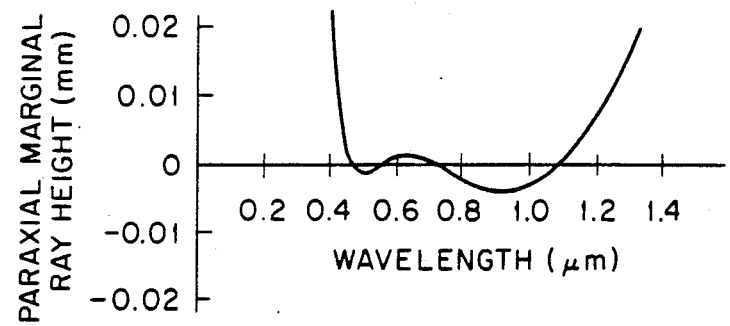
FIG_7
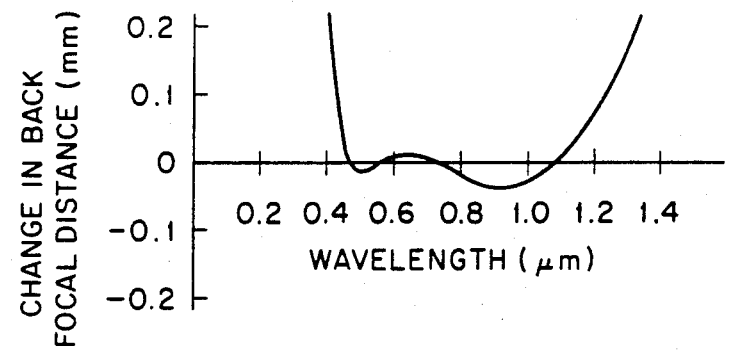
FIG_8
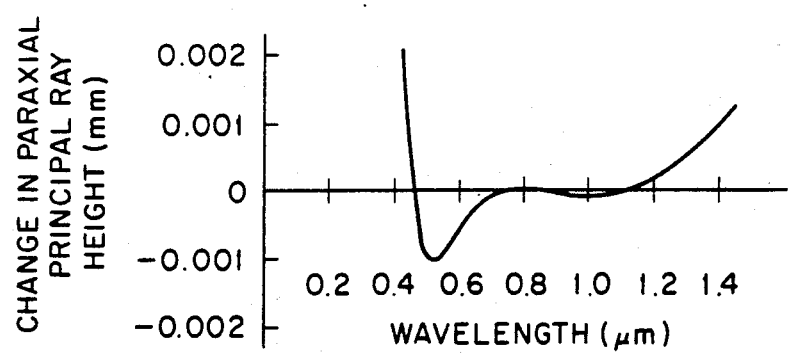

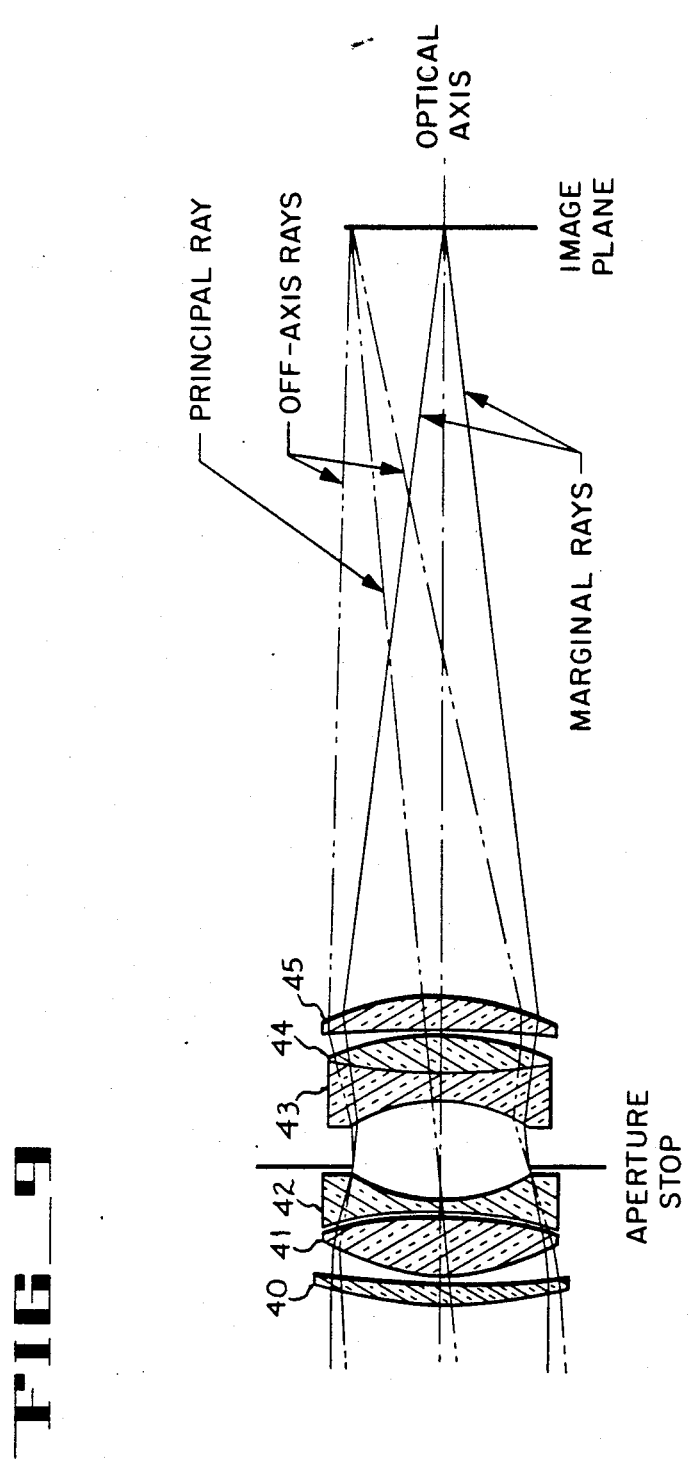
FIG_9

FIG_10
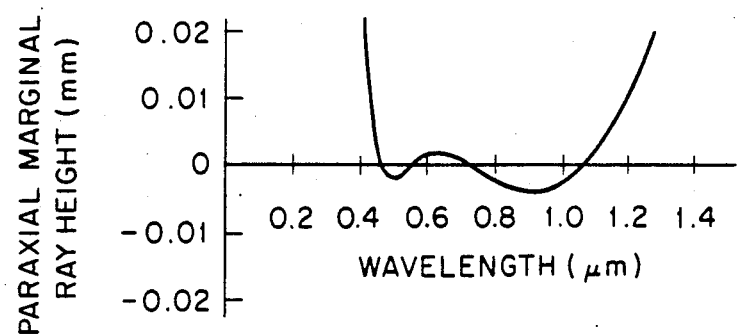
FIG_11
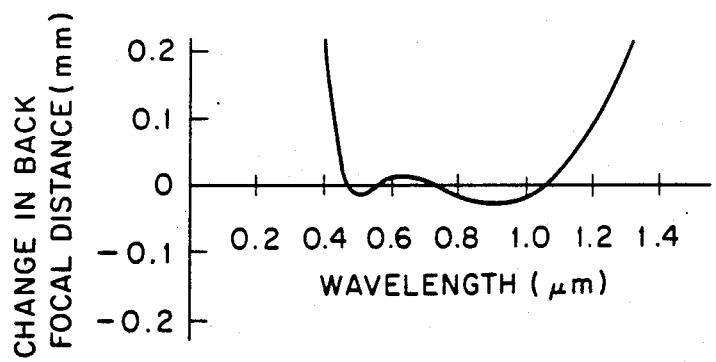

THREE-GLASS PHOTOGRAPHIC OBJECTIVE COLOR-CORRECTED AT FOUR WAVELENGTHS

TECHNICAL FIELD

This invention relates generally to optical objectives, and more particularly to a well-corrected three-glass optical system of moderately high resolution for use as a photographic objective.

BACKGROUND OF THE INVENTION

Commerically available photographic objectives are generally color-corrected at only two wavelengths in a relatively narrow spectral range.

SUMMARY OF THE INVENTION

The present invention provides a three-glass optical objective (i.e., an optical objective made of three different kinds of optical glasses) of moderately high resolution, which is well-corrected for both monochromatic and chromatic aberrations, and which is color-corrected at four wavelengths in a band extending from the visible to the near infrared regions of the electromagnetic spectrum.

DESCRIPTION OF THE DRAWING

FIG. 1 is a profile drawing of a first optical objective according to the present invention, whose design form is optimized for a 200 mm focal length at a relative aperture of f/4 over a field of view of 12° without vignetting.

FIG. 2 is a plot of paraxial marginal ray height versus wavelength for the objective of FIG. 1.

FIG. 3 is a plot of change in back focal distance versus wavelength for the objective of FIG. 1.

FIG. 4 is a plot of change in paraxial principal ray height versus wavelength for the objective of FIG. 1.

FIG. 5 is a profile drawing of a second optical objective according to the present invention, whose design form is optimized for a 200 mm focal length at a relative aperture of f/5 over a field of view of 20° without vignetting.

FIG. 6 is a plot of paraxial marginal ray height versus wavelength for the objective of FIG. 5.

FIG. 7 is a plot of change in back focal distance versus wavelength for the objective of FIG. 5.

FIG. 8 is a plot of change in paraxial principal ray height versus wavelength for the objective of FIG. 5.

FIG. 9 is a profile drawing of a third optical objective according to the present invention, whose design form is optimized for a 200 mm focal length at a relative aperture of f/4 over a field of view of 12° without vignetting.

FIG. 10 is a plot of paraxial marginal ray height versus wavelength for the objective of FIG. 9.

FIG. 11 is a plot of change in back focal distance versus wavelength for the objective of FIG. 9.

BEST MODE OF CARRYING OUT THE INVENTION

A first optical objective according to the present invention is schematically illustrated in FIG. 1 for an equivalent focal length of 200 mm at a relative aperture of f/4 over a field of view of 12° without vignetting. The objective shown in FIG. 1, which is made from three different optical glasses, has a design form that provides substantially diffraction-limited performance over a spectral band extending from visible to near infrared wavelengths of the electromagnetic spectrum, and which is color-corrected at four wavelengths in that spectral band.

The design form for the objective shown in FIG. 1 could be scaled up or down from the 200 mm focal length to different focal lengths for the same relative aperture depending upon the requirements of particular applications. In general, the aberrations of an optical system with fixed aperture ration and field of view are scaled up or down in proportion to the system focal length. In applications that permit vignetting, the design form for the objective shown in FIG. 1 could readily be optimized to achieve color-correction at the same number of wavelengths over a wider field of view than 12°.

The optical objective of FIG. 1 comprises two groups of lens elements separated by an aperture stop. The lens elements of the two groups are arranged along an optic axis so that each lens element is rotationally symmetric with respect to the optic axis. Each group comprises three lens elements, viz., a positive meniscus lens, a positive biconvex lens and a negative biconcave lens. Three different kinds of optical glasses, viz., Hoya ADC1 glass, Hoya TAF1 glass and Hoya SBF1 glass manufactured by Hoya Corporation of Tokyo, Japan, are used for the lens elements of the optical objective shown in FIG. 1.

The design parameters for the optical objective shown in FIG. 1 are referred to a base wavelength of $\lambda_0 = 0.58756$ micron (i.e., the yellow helium d line), and are specified in TABLE I as follows:

TABLE I

| Surface No. | Radius (mm) | Thickness (mm) | $N_d$ | $V_d$ | Material |
| --- | --- | --- | --- | --- | --- |
| 1 | 61.267 | 7.813 | 1.62000 | 62.19 | ADC1 |
| 2 | 404.783 | 3.003 | | | Air |
| 3 | 67.358 | 10.034 | 1.62000 | 62.19 | ADC1 |
| 4 | −136.878 | 0.220 | | | Air |
| 5 | −135.667 | 7.260 | 1.77250 | 49.62 | TAF1 |
| 7 | Aperture stop | 20.293 | | | Air |
| 8 | −41.821 | 3.107 | 1.55115 | 49.52 | SBF1 |
| 9 | 67.326 | 0.000 | | | [cemented] |
| 10 | 67.326 | 14.459 | 1.62000 | 62.19 | ADC1 |
| 11 | −59.927 | 0.133 | | | Air |
| 12 | −302.375 | 4.494 | 1.62000 | 62.19 | ADC1 |
| 13 | −84.403 | 160.787 | | | Air |
| 14 | Image plane | | | | | where the surfaces of the lens elements and the other optically significant surfaces are numbered consecutively from left to right in accordance with conventional optical design practice.

The radius listed in the second column of the table for each surface is the radius of curvature of the particular surface expressed in millimeters. In accordance with convention, the radius of curvature of an optical surface is said to be positive if the center of curvature of the surface lies to the right of the surface, and negative if the center of curvature of the surface lies to the left of the surface. The thickness listed in the third column of the table for each surface is the thickness of the lens element, or of the spacing, bounded on the left by the particular surface. Thickness is expressed in millimeters, and is measured along the optic axis of the objective. The heading $N_d$ in the fourth column of the table indicates the refractive index of the lens element bounded on the left by the indicated surface, where the value of the refractive index is given for the yellow helium d line. The heading $V_d$ in the fifth column of the table indicates the Abbe number for the particular lens element at the same base wavelength. The "material" listed in the sixth column of the table for each surface refers to the type of optical material (i.e., the type of glass) used for making the lens element bounded on the left by the indicated surface.

The embodiment illustrated in FIG. 1 comprises a first group of lens elements (viz., a positive meniscus lens 20, a biconvex lens 21 and a biconcave lens 22) and a second group of lens elements (viz., a biconcave lens 23, a biconvex lens 24 and a positive meniscus lens 25) disposed coaxially with respect to each other along the optic axis. The first and second groups of lens elements are separated by an aperture stop.

The surfaces of the lens elements, and also the positions of the aperture stop and the image plane, of the optical objective shown in FIG. 1 are listed in consecutive order (from left to right along the optic axis) in TABLE 1. The surfaces No. 1 and No. 2 listed in the table are the surfaces of the lens element 20, which is made of Hoya ADC1 glass. The surfaces No. 3 and No. 4 are the surfaces of the lens element 21, which is likewise made of Hoya ADC1 glass, and which is separated from the lens element 20 by an air gap of 3.003 mm measured along the optic axis. The surfaces No. 5 and No. 6 are the surfaces of the lens element 22, which is made of Hoya TAF1 glass. The lens element 22 is separated from the lens element 21 by a small air gap of 0.220 mm measured along the optic axis.

The surface No. 7 indicates the position of the aperture stop for the optical objective shown in FIG. 1, and is located 5.927 mm from the lens element 22 along the optic axis.

The surfaces No. 8 and No. 9 listed in the table are the surfaces of the lens element 23, which is made of Hoya SBF1 glass, and which is located 20.293 mm from the aperture stop along the optic axis. The surfaces No. 10 and No. 11 are the surfaces of the lens element 24, which is made of Hoya ADC1 glass, and which is cemented to the lens element 23. The surfaces No. 12 and No. 13 are the surfaces of the lens element 25, which is made of Hoya ADC1 glass, and which is separated by only 0.133 mm from the lens element 24 along the optic axis.

The lens elements 20, 21, 22, 23, 24 and 25 form a lens System of net positive dioptric power having a focal plane (or image plane) listed as surface No. 14, which is located at a distance 160.787 mm from the lens element 25 along the optic axis. The distance from the surface No. 13 to the surface No. 14 is called the back focal distance of the system.

The index of refraction $N_d$ for each lens element is an experimentally determined value as determined by the glass manufacturer, Hoya Corporation, for the wavelength $\lambda_0 = 0.58756$ micron. The Abbe number $V_d$ for each lens element is the ratio $(N_d - 1)/(N_F - N_C)$, where $N_F$ is the refractive index of the particular glass at the hydrogen F line (i.e., at 0.48613 micron) and $N_C$ is the refractive index of the particular glass at the hydrogen C line (i.e., at 0.65627 micron). The values of $N_d$ and $V_d$ listed in the table for a particular surface refer to the lens element shown to the right of the indicated surface in FIG. 1. The optical material from which each lens element is made is technically specified in terms of the index of refraction $N_d$ and the Abbe number $V_d$. However, as a practical matter, optical designers ordinarily specify an optical glass in terms of the manufacturer's name and catalog number.

A measure of the extent to which secondary and high-order spectra have been minimized for the optical objective illustrated in FIG. 1 is indicated by the plot of paraxial marginal ray height versus wavelength shown in FIG. 2. The value of the paraxial marginal ray height at a given focal surface for an imaging system at any particular wavelength is a measure of the extent of the geometrical image blur (i.e., the image blur without consideration of diffraction effects) inherent in the system at that particular wavelength. The variation of paraxial marginal ray height with wavelength at a given focal surface provides an indication of the extent to which axial chromatic aberration is corrected in the system.

For the optical objective of the present invention, the curve in FIG. 2 illustrating the variation of paraxial marginal ray height with respect to wavelength indicates that axial chromatic aberration is precisely corrected (i.e., color correction is achieved) at four wavelengths (as indicated by the four crossings of the wavelength axis by the curve) in a wavelength band extending from the visible to the near infrared regions of the optical spectrum. Furthermore, the curve in FIG. 2 is close to the wavelength axis (i.e., paraxial marginal ray height is quite small) for all wavelengths between those for which color correction is achieved.

In FIG. 3, the change in back focal distance is plotted as a function of wavelength for the optical objective shown in FIG. 1. For a color-corrected imaging system, paraxial marginal rays at the wavelengths for which color correction has been achieved are brought to a common focus. The back focal distance for those wavelengths for which color correction has been achieved can be considered as a "baseline" back focal distance. For the wavelengths at which color correction has not been achieved (i.e., for the wavelengths between the crossing points on the horizontal axis for the curve of FIG. 2), the paraxial marginal rays are focussed at other focal surfaces whose positions along the optic axis of the imaging system are dependent upon wavelength. The variation with wavelength of the back focal distance with respect to the "baseline" back focal distance provides an indication of the chromatic variation in focal position along the optic axis of the system, and hence is commonly called "longitudinal" or "axial" chromatic aberration. The curve of FIG. 3 also provides a measure of the axial chromatic aberration, and indicates that the optical objective shown in FIG. 1 is very well-corrected for axial chromatic aberration.

In FIG. 4, the change in paraxial principal ray height is plotted as a function of wavelength for the optical objective shown in FIG. 1. The value of the paraxial principal ray height at a given local surface for an imaging system changes with wavelength. For a color-corrected imaging system, the paraxial principal ray height at the focal surface for which color-correction has been achieved can be considered as a "baseline" paraxial principal ray height. In FIG. 4, the variation with wavelength of the paraxial principal ray height with respect to the "baseline" paraxial principal ray height provides a measure of the chromatic variation of image height, which is commonly called the chromatic difference of magnification, or lateral chromatic aberration, or "lateral color". The optical objective shown in FIG. 1 is thus seen to be very well-corrected for lateral chromatic aberration.

The design parameters tabulated above in TABLE I (which pertain specifically to an optical objective having an equivalent focal length of 200 mm, a relative aperture of f/4 and a field of view of 12° without vignetting) can be utilized in designing homologous optical objectives having other focal lengths by multiplying the tabulated values for the surface radii and for the axial thicknesses of the lens elements and the air spaces by an appropriate scaling factor. Thus, for a homologous optical objective having a focal length of 100 mm, the scaling factor would be 0.5 (i.e., 100 mm/200 mm=0.5); and for a homologous optical objective having a focal length of 400 mm, the scaling factor would be 2 (i.e., 400 mm/200 mm=2).

A second optical objective according to the present invention is schematically illustrated in FIG. 5 for a 200 mm focal length at a relative aperture of f/5 over a field of view of 20° without vignetting. The objective shown in FIG. 5, which is made from the same three optical glasses as the objective shown in FIG. 1, likewise has a design form that provides substantially diffraction-limited performance over a spectral band extending from visible to near infrared wavelengths of the electromagnetic spectrum, and likewise is color-corrected at four wavelengths in that spectral band.

The design parameters for the optical objective shown in FIG. 5 are likewise referred to the yellow helium d line as a base wavelength, and are specified in TABLE II as follows:

TABLE II

| Surface No. | Radius (mm) | Thickness (mm) | $N_d$ | $V_d$ | Material |
|---|---|---|---|---|---|
| 1 | 68.148 | 8.000 | 1.62000 | 62.19 | ADCl |
| 2 | 260.969 | 5.197 | | | Air |
| 3 | 56.587 | 10.509 | 1.62000 | 62.19 | ADCl |
| 4 | −224.813 | 0.233 | | | Air |
| 5 | −248.416 | 4.263 | 1.77250 | 49.62 | TAF1 |
| 6 | 37.451 | 8.740 | | | Air |
| 7 | Aperture stop | 18.323 | | | Air |
| 8 | −33.418 | 3.072 | 1.55115 | 49.52 | SBF1 |
| 9 | 87.482 | 0.000 | | | [cemented] |
| 10 | 87.482 | 10.310 | 1.62000 | 62.19 | ADCl |
| 11 | −45.855 | 0.141 | | | Air |
| 12 | −180.385 | 4.391 | 1.62000 | 62.19 | ADCl |
| 13 | −70.484 | 168.078 | | | Air |
| 14 | Image plane | | | | | where the surfaces of the lens elements and the other optically significant surfaces are numbered consecutively from left to right in accordance with conventional optical design practice.

The embodiment illustrated in FIG. 5 comprises a first group of lens elements (viz., a positive meniscus lens 30, a biconvex lens 31 and a biconcave lens 32) and a second group of lens elements (viz., a biconcave lens 33, a biconvex lens 34 and a positive meniscus lens 35) disposed coaxially with respect to each other along the optic axis. The first and second groups of lens elements are separated by an aperture stop.

The surfaces of the lens elements, and also the positions of the aperture stop and the image plane, of the optical objective shown in FIG. 5 are listed in consecutive order (from left to right along the optic axis) in TABLE II. Thus, the surfaces No. 1 and No. 2 are the surfaces of the lens element 30, which is made of Hoya ADCl glass. The surfaces NO. 3 and No. 4 are the surfaces of the lens element 31, which is also made of Hoya ADCl glass. The surfaces No. 5 and No. 6 are the surfaces of the lens element 32, which is made of Hoya TAF1 glass. The surface No. 7 indicates the position of the aperture stop. The surfaces No. 8 and No. 9 are the surfaces of the lens element 33, which is made of Hoya SBF1 glass. The surfaces No. 10 and No. 11 are the surfaces of the lens element 34, which is made of Hoya ADC1 glass. The surfaces No. 12 and No. 13 are the surfaces of the lens element 35, which is made of Hoya ADC1 glass. The lens elements 30, 31, 32, 33, 34 and 35 form a lens system of net positive dioptric power having a focal plane listed as surface No. 14. The distance from the surface No. 13 to the surface No. 14 is the back focal distance of the system.

A plot of paraxial marginal ray height versus wavelength for the optical objective of FIG. 5 is shown in FIG. 6. The curve in FIG. 6 crosses the horizontal (i.e., wavelength) axis at four wavelengths in a spectral band extending from the visible into the near infrared wavelengths, therefore indicating that the objective shown in FIG. 5 is color-corrected at those four wavelengths. Furthermore, the closeness of the curve in FIG. 6 to the horizontal axis throughout that wavelength band indicates that the objective shown in FIG. 5 has minimal secondary and higher-order spectra throughout that wavelength band.

A plot of change in back focal distance versus wavelength for the optical objective of FIG. 5 is shown in FIG. 7. The closeness of the curve in FIG. 7 to the horizontal axis indicates that the objective shown in FIG. 5 is very well-corrected for axial chromatic aberration throughout the wavelength band for which minimization of the secondary and higher-order spectra has been achieved.

A plot of change in paraxial principal ray height versus wavelength for the optical objective of FIG. 5 is shown in FIG. 8. The closeness of the curve in FIG. 8 to the horizontal axis indicates that the objective shown in FIG. 5 is also very well-corrected for lateral chromatic aberration throughout the same wavelength band for which correction of axial chromatic aberration has been achieved.

As discussed above in connection with the embodiment illustrated in FIG. 1, the design parameters for the embodiment of FIG. 5 (as tabulated above in TABLE II) can be utilized in designing a homologous optical objective having a different focal length. A scaling factor is first obtained by determining the ratio of the actual focal length of the homologous objective to the 200 mm focal length of the objective whose design parameters are listed in the table. Then, the tabulated values for the radii of the lens surfaces, and for the axial thicknesses of the lens elements and the air spaces are multiplied by the scaling factor to yield the design parameters for the homologous objective.

A third optical objective according to the present invention is schematically illustrated in FIG. 9 for a 200 mm focal length at a relative aperture of f/4 over a field of view of 12° without vignetting. The objective shown in FIG. 9, which is made from the same three optical glasses as are used to make the objective shown in FIG. 5, likewise has a design form that provides substantially diffraction-limited performance over a spectral band extending from visible to near infrared wavelengths of the electromagnetic spectrum, and likewise is color-corrected at four wavelengths in that spectral band.

The design parameters for the optical objective shown in FIG. 1 are likewise referred to the yellow helium d line as a base wavelength, and are specified in TABLE III as follows:

TABLE III

| Surface No. | Radius (mm) | Thickness (mm) | $N_d$ | $V_d$ | Material |
| --- | --- | --- | --- | --- | --- |
| 1 | 104.759 | 4.044 | 1.62000 | 62.19 | ADC1 |
| 2 | 221.905 | 2.520 | | | Air |
| 3 | 53.830 | 13.188 | 1.62000 | 62.19 | ADC1 |
| 4 | −113.412 | 0.196 | | | Air |
| 5 | −114.502 | 3.163 | 1.55115 | 49.52 | SBF1 |
| 6 | 40.019 | 6.625 | | | Air |
| 7 | Aperture stop | 14.987 | | | Air |
| 8 | −41.660 | 6.322 | 1.77250 | 49.62 | TAF1 |
| 9 | 168.199 | 0.000 | | | [cemented] |
| 10 | 168.199 | 9.136 | 1.62000 | 62.19 | ADC1 |
| 11 | −64.833 | 0.178 | | | Air |
| 12 | −953.890 | 7.581 | 1.62000 | 62.19 | ADC1 |
| 13 | −63.605 | 172.303 | | | Air |
| 14 | Image plane | | | | | where the surfaces of the lens elements and the other optically significant surfaces are numbered consecutively from left to right in accordance with conventional optical design practice.

The embodiment illustrated in FIG. 9 comprises a first group of lens elements (viz., a positive meniscus lens 40, a biconvex lens 41 and a biconcave lens 42) and a second group of lens elements (viz., a biconcave lens 43, a biconvex lens 44 and a positive meniscus lens 45) disposed coaxially with respect to each other along the optic axis. The first and second groups of lens elements are separated by an aperture stop.

The surfaces of the lens elements, and also the positions of the aperture stop and the image plane, of the optical objective shown in FIG. 9 are listed in consecutive order (from left to right along the optic axis) in TABLE III. Thus, the surfaces No. 1 and No. 2 are the surfaces of the lens element 40, which is made of Hoya ADC1 glass. The surfaces No. 3 and No. 4 are the surfaces of the lens element 41, which is also made of Hoya ADC1 glass. The surfaces No. 5 and No. 6 are the surfaces the lens element 42, which is made of Hoya SBF1 glass. The surface No. 7 indicates the position of the aperture stop. The surfaces No. 8 and No. 9 are the surfaces of the lens element 43, which is made of Hoya TAF1 glass. The surfaces No. 10 and No. 11 are the surfaces of the lens element 44, which is made of Hoya ADC1 glass. The surfaces No. 12 and No. 13 are the surfaces of the lens element 45, which is made of Hoya ADC1 glass. The lens elements 40, 41, 42, 43, 44 and 45 form a lens system of not positive dioptric power having a focal plane listed as surface No. 14. The distance from the surface No. 13 to the surface No. 14 is the back focal distance of the system.

The outstanding difference between the optical objective of FIG. 5 and the optical objective of FIG. 9 is in the materials of which the third and fourth lens elements of the objective are made. For the objective of FIG. 5, the lens element 32 is made of Hoya TAF1 glass and the lens element 33 is made of Hoya SBF1 glass. For the objective of FIG. 9, on the other hand, the lens element 42 is made of Hoya SBF1 glass and the lens element 43 is made of Hoya TAF1 glass. Otherwise, however, the lens element 42 has the same general configuration as the lens element 32, and the lens element 43 has the same general configuration as the lens element 33.

A plot of paraxial marginal ray height versus wavelength for the optical objective of FIG. 9 is shown in FIG. 10. The curve of FIG. 10 indicates that the objective of FIG. 9 is color-corrected at four wavelengths in a band extending from the visible to the near infrared wavelengths of the electromagnetic spectrum, and has minimal secondary and higher-order spectra throughout that wavelength band. A plot of the change in back focal distance versus wavelength for the optical objective of FIG. 9 is shown in FIG. 11. The curve in FIG. 11 indicates that the objective of FIG. 9 is also very well-corrected for axial chromatic aberration.

As for the design parameters of the embodiments illustrated in FIGS. 1 and 5, so also the design parameters for the embodiment of FIG. 9 (as tabulated above in TABLE III) can be utilized in designing a homologous optical objective having a different focal length. A scaling factor is obtained for the actual focal length desired for the homologous objective, and the tabulated values for the radii of the lens surfaces and for the axial thicknesses of the lens elements and the air spaces given in TABLE III are multiplied by the scaling factor.

The curves of FIGS. 10 and 11 for the optical objective of FIG. 9 are very similar to the corresponding curves of FIGS. 6 and 7 for the optical objective of FIG. 5, and to the corresponding curves of FIGS. 2 and 3 for the optical objective of FIG. 1. The similarity of the corresponding curves for these different embodiments of the invention is attributable to the fact that all of the embodiments utilize the same three types of optical glasses.

It is not apparent a priori that color correction at four wavelengths in the same wide spectral band could be obtained, if either the Hoya TAF1 glass of the Hoya SBF1 glass in the design parameters of the embodiments shown in FIGS. 1, 5, and 9 were to be replaced by any other type of optical glass. However, it has been found that Hoya TAF1 glass could be replaced by Hoya LAC10 glass or by Hoya LACL4 glass, and that Hoya SBF1 glass could be replaced by Hoya CF6 glass, Schott KF6 glass or Schott KF9 glass (where the Schott glasses are available from Schott Optical Glass Inc. of Duryea, Pa. in the design forms for the optical objectives shown in FIGS. 1, 5 and 9, and that the resulting optical objectives after re-optimization of the design forms would still be well-corrected for both monochromatic and chromatic aberrations, and would still be color-corrected at four wavelengths in the same wide spectral band.

A practicing optical designer skilled in the art, having the design parameters listed in TABLES I, II and III above as a starting point, and having been informed of the suitability of Hoya LAC10 glass and Hoya LACL4 glass as substitutes for Hoya TAF1 glass, and of the suitability of Hoya CF6 glass, Schott KF6 glass and Schott KF9 glass as substitutes for Hoya SBF1 glass, and using the values of $N_d$ and $V_d$ for the substitute glasses as listed in TABLE IV below, should be able without undue effort to re-optimize the design forms shown in FIGS. 1, 5, and 9 for the substitute glasses so as to achieve optimal correction of both monochromatic and chromatic aberrations. The values of the index of refraction $N_d$ and the Abbe number $V_d$ at the base wavelength $\lambda_O = 0.58756$ micron for the substitute glasses indicated above are as follows:

TABLE IV

| Glass | $N_d$ | $V_d$ |
| --- | --- | --- |
| Hoya LAC10 | 1.72000 | 50.34 |
| Hoya LACL4 | 1.66960 | 51.66 |
| Hoya CF6 | 1.51742 | 52.15 |
| Schott KF6 | 1.51742 | 52.20 |

TABLE IV-continued

| Glass | $N_d$ | $V_d$ |
| --- | --- | --- |
| Schott KF9 | 1.52341 | 51.49 |

This invention has been described above in terms of particular embodiments designed using particular commercially available optical glasses, which enable color correction to be achieved at four wavelengths. Each of the detailed optical prescriptions for the embodiments shown herein has been optimized for a particular focal length, a particular aperture ratio, and a particular field of view. The embodiments illustrated are merely descriptive of the invention, which is defined more generally by the following claims and their equivalents.

I claim:

1. An optical objective consisting of six lens elements, said six lens elements being positioned coaxially with respect to each other along an optic axis so that three of said lens elements form a first group disposed on a first side of an aperture stop of said objective, and so that another three of said lens elements form a second group disposed on a second side of said aperture stop, said six lens elements being made from only three different optical materials, said first group of lens elements being made only from a first one and a second one of said optical materials, said second group of lens elements being made only from a third one and said first one of said optical materials, said six lens elements coacting with each other so that paraxial marginal rays passing through said objective are brought to a common focus on said optic axis at four discrete wavelengths.

2. The optical objective of claim 1 wherein said first one of said three different optical materials has an index of refraction of approximately 1.62 and an Abbe number of approximately 62.19 at a base wavelength of 0.58756 micron, said second one of said three different optical materials has an index of refraction of approximately 1.77 and an Abbe number of approximately 49.62 at said base wavelength, and said third one of said three different optical materials has an index of refraction of approximately 1.55 and an Abbe number of approximately 49.52 at said base wavelength.

3. The optical objective of claim 2 wherein said first one of said three different optical materials is Hoya ADC1 optical glass, said second one of said three different optical materials is Hoya TAF1 optical glass, and said third one of said three different optical materials is Hoya SBF1 optical glass.

4. The optical objective of claim 2 having a design form optimized for a focal length of 200 millimeters at a relative aperture of f/4 over a field of view of 12° without vignetting, as follows:

| Surface No. | Radius (mm) | Thickness (mm) | Material |
| --- | --- | --- | --- |
| 1 | 61.267 | 7.813 | ADC1 |
| 2 | 404.783 | 3.003 | Air |
| 3 | 67.358 | 10.034 | ADC1 |
| 4 | −136.878 | 0.220 | Air |
| 5 | −135.667 | 7.260 | TAF1 |
| 6 | 38.243 | 5.927 | Air |
| 7 | Aperture Stop | 20.293 | Air |
| 8 | −41.821 | 3.107 | SBF1 |
| 9 | 67.326 | 0.000 | |
| 10 | 67.326 | 14.459 | ADC1 |
| 11 | −59.927 | 0.133 | Air |
| 12 | −302.375 | 4.494 | ADC1 |
| 13 | −84.403 | 160.787 | Air |
| 14 | Image plane | | | where surfaces No. 1 and No. 2 are the surfaces of a first one of said lens elements, surfaces No. 3 and No. 4 are the surfaces of a second one of said lens elements, surfaces No. 5 and No. 6 are the surfaces of a third one of said lens elements, surface No. 7 indicates an aperture stop for said objective, surfaces No. 8 and No. 9 are the surfaces of a fourth one of said lens elements, surfaces No. 10 and 11 are the surfaces of a fifth one of said lens elements, surfaces No. 12 and No. 13 are the surfaces of a sixth one of said lens elements, and surface No. 14 indicates a focal plane, said lens elements being disposed consecutively along said optic axis, each of said lens elements being rotationally symmetric about said optic axis, each of said lens elements having a radius of curvature and a thickness (as tabulated above) measured along said optic axis, spacings between adjacent surfaces being measured along said optic axis, and where ADC1, TAF1 and SBF1 are catalog designations uniquely specifying said first, second and third ones of said three different optical materials as optical glasses marked by Hoya Corporation.

5. The optical objective of claim 1, said objective having an actual focal length different from 200 millimeters at a relative aperture of f/4 over a field of view of 12°, said objective having lens elements whose surface radii of curvature and whose axial thicknesses and spacings between lens elements are obtained from a design form optimized for a focal length of 200 millimeters at said relative aperture over said field of view whose values are tabulated as follows:

| Surface No. | Radius (mm) | Thickness (mm) | Material |
| --- | --- | --- | --- |
| 1 | 61.267 | 7.813 | ADC1 |
| 2 | 404.783 | 3.003 | Air |
| 3 | 67.358 | 10.034 | ADC1 |
| 4 | −136.787 | 0.220 | Air |
| 5 | −135.667 | 7.260 | TAF1 |
| 6 | 38.243 | 5.927 | Air |
| 7 | Aperture Stop | 20.293 | Air |
| 8 | −41.821 | 3.107 | SBF1 |
| 9 | 67.326 | 0.000 | (cemented) |
| 10 | 67.326 | 14.459 | ADC1 |
| 11 | −59.927 | 0.133 | Air |
| 12 | −302.375 | 4.494 | ADC1 |
| 13 | −84.403 | 160.787 | Air |
| 14 | Image plane | | | where surfaces No. 1 and No. 2 are the surfaces of a first one of said lens elements, surfaces No. 3 and No. 4 are the surfaces of a second one of said lens elements, surfaces No. 5 and No. 6 are the surfaces of a third one of said lens elements, surface No. 7 indicates an aperture stop for said objective, surfaces No. 8 and No. 9 are the surfaces of a fourth one of said lens elements, surfaces No. 10 and 11 are the surfaces of a fifth one of said lens elements, surfaces No. 12 and No. 13 are the surfaces of a sixth one of said lens elements, and surface No. 14 indicates a focal plane, said lens elements being disposed consecutively along said optic axis, each of said lens elements being rotationally symmetric about said optic axis, each of said lens elements having a radius of curvature and a thickness (as tabulated above) measured along said optic axis, spacings between adjacent surfaces being measured along said optic axis, and where ADC1, TAF1 and SBF1 are catalog designations uniquely specifying three different optical materials as optical glasses marked by Hoya Corporation, the radii of curvature and axial thicknesses of said lens elements and the spacings between said adjacent surfaces being determined by multiplying said values for radii and for thickness and spacings (as tabulated above) by a scaling factor, said scaling factor being the ratio of said actual focal length to said 200-millimeter focal length for which said tabulated values are optimized.

6. The optical objective of claim 2 having a design form optimized for a focal length of 200 millimeters at a relative aperture of f/5 over a field of view of 20° without vignetting, as follows:

| Surface No. | Radius (mm) | Thickness (mm) | Material |
|---|---|---|---|
| 1 | 68.148 | 8.000 | ADCl |
| 2 | 260.969 | 5.197 | Air |
| 3 | 56.587 | 10.509 | ADCl |
| 4 | −224.813 | 0.233 | Air |
| 5 | −248.416 | 4.263 | TAFl |
| 6 | 37.451 | 8.740 | Air |
| 7 | Aperture Stop | 18.323 | Air |
| 8 | −33.418 | 3.072 | SBFl |
| 9 | 87.482 | 0.000 | |
| 10 | 87.482 | 10.310 | ADCl |
| 11 | −45.855 | 0.141 | Air |
| 12 | −180.385 | 4.391 | ADCl |
| 13 | −70.484 | 168.078 | Air |
| 14 | Image plane | | | where surfaces No. 1 and No. 2 are the surfaces of a first one of said lens elements, surfaces No. 3 and No. 4 are the surfaces of a second one of said lens elements, surfaces No. 5 and No. 6 are the surfaces of a third one of said lens elements, surface No. 7 indicates an aperture stop for said objective, surfaces No. 8 and No. 9 are the surfaces of a fourth one of said lens elements, surfaces No. 10 and 11 are the surfaces of a fifth one of said lens elements, surfaces No. 12 and No. 13 are the surfaces of a sixth one of said lens elements, surface No. 14 indicates a focal plane, said lens elements being disposed consecutively along said optic axis, each of said lens elements being rotationally symmetric about said optic axis, each of said lens elements having a radius of curvature and a thickness (as tabulated above) measured along said optic axis, spacings between adjacent surfaces being measured along said optic axis, and where ADC1, TAF1 and SBF1 are catalog designations uniquely specifying said first, second and third ones of said three different optical materials as optical glasses marketed by Hoya Corporation.

7. The optical objective of claim 1, said objective having an actual focal length different from 200 millimeters at a relative aperture of f/5 over a field view of 20°, said objective having lens elements whose surface radii of curvature and whose axial thickness and spacings between lens elements are obtained from a design form optimized for a focal length of 200 millimeters at said relative aperture over said field of view whose values are tabulated as follows:

| Surface No. | Radius (mm) | Thickness (mm) | Material |
|---|---|---|---|
| 1 | 68.148 | 8.000 | ADCl |
| 2 | 260.969 | 5.197 | Air |
| 3 | 56.587 | 10.509 | ADCl |
| 4 | −224.813 | 0.233 | Air |
| 5 | −248.416 | 4.263 | TAFl |
| 6 | 37.451 | 8.740 | Air |
| 7 | Aperture Stop | 18.323 | Air |
| 8 | −33.418 | 3.072 | SBFl |
| 9 | 87.482 | 0.000 | (cemented) |
| 10 | 87.482 | 10.310 | ADCl |
| 11 | −45.855 | 0.141 | Air |
| 12 | −180.385 | 4.391 | ADCl |
| 13 | −70.484 | 168.078 | Air |
| 14 | Image plane | | | where surfaces No. 1 and No. 2 are the surfaces of a first one of said lens elements, surfaces No. 3 and No. 4 are the surfaces of a second one of said lens elements, surfaces No. 5 and No. 6 are the surfaces of a third one of said lens elements, surface No. 7 indicates an aperture stop for said objective, surfaces No. 8 and No. 9 are the surfaces of a fourth one of said lens elements, surfaces No. 10 and 11 are the surfaces of a fifth one of said lens elements, surfaces No. 12 and No. 13 are the surfaces of a sixth one of said lens elements, and surface No. 14 indicates a focal plane, said lens elements being disposed consecutively along said optic axis, each of said lens elements being rotationally symmetric about said optic axis, each of said lens elements having a radius of curvature and a thickness (as tabulated above) measured along said optic axis, spacings between adjacent surfaces being measured along said optic axis, and where ADC1, TAF1 and SBF1 are catalog designations uniquely specifying three different optical glasses marketed by Hoya Corporation, the radii of curvature and axial thicknesses of said lens elements and the spacings between said adjacent surfaces being determined by multiplying said values for radii and for thicknesses and spacings (as tabulated above) by a scaling factor, said scaling factor being the ratio of said actual focal length to said 200-millimeter focal length for which said tabulated values are optimized.

8. The optical objective of claim 2 having a design from optimized for a focal length of 200 millimeters at a relative aperture of f/4 over a field of view of 12° without vignetting, as follows:

| Surface No. | Radius (mm) | Thickness (mm) | Material |
|---|---|---|---|
| 1 | 104.759 | 4.044 | ADCl |
| 2 | 221.905 | 2.520 | Air |
| 3 | 53.830 | 13.188 | ADCl |
| 4 | −113.412 | 0.196 | Air |
| 5 | −114.502 | 6.625 | SBFl |
| 6 | 40.019 | 6.625 | Air |
| 7 | Aperture Stop | 14.987 | Air |
| 8 | −41.660 | 6.322 | TAFl |
| 9 | 168.199 | 0.000 | |
| 10 | 168.199 | 9.136 | ADCl |
| 11 | −64.833 | 0.178 | Air |
| 12 | −953.890 | 7.581 | ADCl |
| 13 | −63.605 | 172.303 | Air |
| 14 | Image plane | | | where surfaces No. 1 and No. 2 are the surfaces of a first one of said lens elements, surfaces No. 3 and No. 4 are the surfaces of a second one of said lens elements, surfaces No. 5 and No. 6 are the surfaces of a third one of said lens elements, surface No. 7 indicates an aperture stop for said objective, surfaces No. 8 and No. 9 are the surfaces of a fourth one of said lens elements, surfaces No. 10 and No. 11 are the surfaces of a fifth one of said lens elements, surfaces No. 12 and No. 13 are the surfaces of a sixth one of said lens elements, and surface No. 14 indicates a focal plane, said lens elements being disposed consecutively along said optic axis, each of said lens elements being rotationally symmetric about said optic axis, each of said lens elements having a radius of curvature and a thickness (as tabulated above) measured along said optic axis, spacings between adjacent surfaces being measured along said optic axis, and where ADC1, TAF1 and SBF1 are catalog designations uniquely specifying said first, second and third ones of said three different optical materials as optical glasses marketed by Hoya Corporation.

9. The optical objective of claim 1, said objective having an actual focal length different from 200 millimeters at a relative aperture of f/4 over a field of view of 12°, said objective having lens elements whose surface radii of curvature and whose axial thicknesses and spacings between lens elements are obtained from a design form optimized for a focal length of 200 millimeters at said relative aperture over said field of view whose values are tabulated as follows:

| Surface No. | Radius (mm) | Thickness (mm) | Material |
|---|---|---|---|
| 1 | 104.759 | 4.044 | ADC1 |
| 2 | 221.905 | 2.520 | Air |
| 3 | 53.830 | 13.188 | ADC1 |
| 4 | −113.412 | 0.196 | Air |
| 5 | −114.502 | 6.625 | SBF1 |
| 6 | 40.019 | 6.625 | Air |
| 7 | Aperture Stop | 14.987 | Air |
| 8 | −41.660 | 6.322 | TAF1 |
| 9 | 168.199 | 0.000 | (cemented) |
| 10 | 168.199 | 9.136 | ADC1 |
| 11 | −64.833 | 0.178 | Air |
| 12 | −953.890 | 7.581 | ADC1 |
| 13 | −63.605 | 172.303 | Air |
| 14 | Image plane | | | where surfaces No. 1 and No. 2 are the surfaces of a first one of said lens elements, surfaces No. 3 and No. 4 are the surfaces of a second one of said lens elements, surfaces No. 5 and No. 6 are the surfaces of a third one of said lens elements, surface No. 7 indicates an aperture stop for said objective, surfaces No. 8 and No. 9 are the surfaces of a fourth one of said lens elements, surfaces No. 10 and No. 11 are the surfaces of a fifth one of said lens elements, surfaces No. 12 and No. 13 are the surfaces of a sixth one of said lens elements, and surface No. 14 indicates a focal plane, said lens elements being disposed consecutively along said optic axis, each of said lens elements being rotationally symmetric about said optic axis, each of said lens elements having a radius of curvature and a thickness (as tabulated above) measured along said optic axis, spacings between adjacent surfaces being measured along said optic axis, and where ADC1, TAF1 and SBF1 are catalog designations uniquely specifying three different optical glasses marketed by Hoya Corporation, the radii of curvature and axial thicknesses of said lens elements and the spacings between said adjacent surfaces being determined by miltiplying said values for radii and for thicknesses and spacings (as tabulated above) by a scaling factor, said scaling factor being the ratio of said actual focal length to said 200-millimeter focal length for which said tabulated values are optimized.

10. The optical objective of claim 1 wherein said first one of said three different optical materials has an index of refraction of approximately 1.62 and an Abbe number of approximately 62.19 at a base wavelength of 0.58756 micron, said second one of said three different optical materials is selected from the group consisting of three materials those indices of refraction and Abbe numbers for the same base wavelength are approximately tabulated as follows:

| Index of Refraction | Abbe Number |
|---|---|
| 1.77250 | 49.62 |
| 1.72000 | 50.34 |
| 1.66960 | 51.66 | and said third one of said three different optical materials is selected from the group consisting of four materials whose indices of refraction and Abbe numbers for the same base wavelength are approximately tabulated as follows:

| Index of Refraction | Abbe Number |
|---|---|
| 1.55115 | 49.52 |
| 1.51742 | 52.15 |
| 1.51742 | 52.20 |
| 1.52341 | 51.49 |

11. The optical objective of claim 10 wherein said first one of said three different optical materials is Hoya ADC1 glass, said second one of said three different optical materials is selected from the group consisting of Hoya TAF1 glass, Hoya LAC10 glass and Hoya LAC14 glass, and said third one of said three different optical materials is selected from the group consisting of Hoya SBF1 glass, Hoya CF6 glass, Schott KF6 glass and Schott KF9 glass.

* * * * *